US009768871B2

(12) United States Patent
Costantini et al.

(10) Patent No.: US 9,768,871 B2
(45) Date of Patent: Sep. 19, 2017

(54) METHOD OF CHANGING OPERATING MODE OF OPTICAL AMPLIFIER IN AN AMPLIFIER CHAIN, OPTICAL APPARATUS AND OPTICAL NETWORK

(71) Applicant: Telefonaktiebolaget LM Ericsson (publ), Stockholm (SE)

(72) Inventors: Matteo Costantini, Genoa (IT); Antonio Melis, Genoa (IT); Lorenzo Siri, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/030,967

(22) PCT Filed: Oct. 24, 2013

(86) PCT No.: PCT/EP2013/072313
§ 371 (c)(1),
(2) Date: Apr. 21, 2016

(87) PCT Pub. No.: WO2015/058805
PCT Pub. Date: Apr. 30, 2015

(65) Prior Publication Data
US 2016/0308617 A1 Oct. 20, 2016

(51) Int. Cl.
*H01S 3/13* (2006.01)
*H01S 3/10* (2006.01)
(Continued)

(52) U.S. Cl.
CPC ....... *H04B 10/296* (2013.01); *H01S 3/10015* (2013.01); *H01S 3/1305* (2013.01);
(Continued)

(58) Field of Classification Search
CPC ... H04B 10/296; H01S 3/1301; H01S 3/1305; H01S 3/10015; H01S 3/2316
See application file for complete search history.

(56) References Cited

U.S. PATENT DOCUMENTS 6,757,099 B2    6/2004   Pavel et al.
6,798,567 B2 *  9/2004   Feldman .......... H04J 14/0221
                                                  359/341.42
(Continued)

FOREIGN PATENT DOCUMENTS

EP    1 094 624    4/2001
EP    1 439 646    7/2014

OTHER PUBLICATIONS

International Search Report for International application No. PCT/EP2013/072313—Jun. 27, 2014.

*Primary Examiner* — Eric Bolda
(74) *Attorney, Agent, or Firm* — Baker Botts, LLP

(57) ABSTRACT

A method (10) of changing operating mode of an optical amplifier in an amplifier chain in an optical network, the optical amplifier initially configured to operate in a first mode to apply a substantially constant first gain to an optical signal comprising a plurality of optical channels, the method comprising, after a time period unique to the optical amplifier within the amplifier chain (12), configuring the optical amplifier to operate in a second mode to apply a second gain to the optical signal so that the optical power of the optical signal is maintained at a target optical power dependent on a current plurality of optical channels in the optical signal (14).

19 Claims, 14 Drawing Sheets

(51) Int. Cl.
*H01S 3/23* (2006.01)
*H04B 10/29* (2013.01)
*H04B 10/296* (2013.01)
*H04B 10/293* (2013.01)
*H04B 10/27* (2013.01)

(52) U.S. Cl.
CPC ........... *H01S 3/2316* (2013.01); *H04B 10/27* (2013.01); *H04B 10/2935* (2013.01)

(56) References Cited

U.S. PATENT DOCUMENTS

| | | | |
|---|---|---|---|
| 2003/0106990 A1* | 6/2003 | Tomofuji | H04B 10/2942 250/214 LA |
| 2004/0028407 A1* | 2/2004 | Noheji | H04B 10/27 398/59 |
| 2007/0002430 A1 | 1/2007 | Mitchell et al. | |
| 2007/0024957 A1* | 2/2007 | Charlet | H04B 10/2916 359/334 |

* cited by examiner

METHOD OF CHANGING OPERATING MODE OF OPTICAL AMPLIFIER IN AN AMPLIFIER CHAIN, OPTICAL APPARATUS AND OPTICAL NETWORK

PRIORITY

This nonprovisional application is a U.S. National Stage Filing under 35 U.S.C. §371 of International Patent Application Serial No. PCT/EP2013/072313, filed Oct. 24, 2013, and entitled "Method of Changing Operating Mode of Optical Amplifier in an Amplifier Chain, Optical Apparatus and Optical Network".

TECHNICAL FIELD

The invention relates to a method of changing operating mode of an optical amplifier in an amplifier chain in an optical network and to a method of operating a plurality of optical amplifiers arranged as an amplifier chain in an optical network. The invention further relates to optical apparatus for an optical amplifier chain in an optical network and to an optical network comprising an optical amplifier chain.

BACKGROUND

Optical amplifiers are provided in optical links of an optical network in order to compensate for optical losses caused by various optical elements within the network. During normal operation of the network, the optical amplifiers are operated to control the per channel optical power so that it is maintained at a preselected target optical power; the optical amplifiers are operated in what is known as a 'closed loop', variable gain condition. When an optical channel is dropped or added, for fast restoration of a wide number of channels or channel upgrade, or when an upstream fibre is unexpectedly cut, a sudden change in the total optical power input to an optical amplifier can occur, known as a power 'transient'. When a transient is detected it is known to switch operation of optical amplifiers to a "freeze" condition in which a constant gain is applied, known as an "open loop" constant gain condition, to manage the optical power transient. This keeps the power of the existing/surviving optical channels stable during the fast power variation at the input of the optical amplifiers caused by the power transient. For example, U.S. Pat. No. 6,757,099 describes an optical power transient control scheme for Erbium doped fibre amplifiers, EDFAs, in which the pump optical power supplied to the Erbium doped fibre is controlled based on a detected variation in the input power of the optical signal entering the EDFA. When the network is has reached a steady state operation, the amplifiers are unfrozen and returned to the 'closed loop' variable gain operating condition. When the amplifiers are restored to 'closed loop' operation there is a risk that an optical power oscillation will be created, with potential impact on traffic. This because the output optical power/gain that the amplifiers are set at in the freeze condition is often slightly different from the actual target figures for normal operation (due to the spectral position of the surviving channels, amplified spontaneous emission, ASE, noise in the amplifiers, and the accuracy of the gain value that the amplifiers are 'frozen' at). When the gain control loops of the optical amplifiers are closed, each optical amplifier sees the output power/gain error and tries to correct the error. This can cause optical power oscillations to occur, even when the error is small.

SUMMARY

It is an object to provide an improved method of changing operating mode of an optical amplifier in an amplifier chain in an optical network. It is a further object to provide an improved method of operating a plurality of optical amplifiers arranged as an amplifier chain in an optical network. It is a further object to provide an improved optical apparatus for an optical amplifier chain in an optical network. It is a further object to provide an improved optical network comprising an optical amplifier chain.

A first aspect of the invention provides a method of changing operating mode of an optical amplifier in an amplifier chain in an optical network. Prior to implementation of the method the optical amplifier is initially configured to operate in a first mode to apply a substantially constant first gain to an optical signal comprising a plurality of optical channels. The method comprises, after a time period unique to the optical amplifier within the amplifier chain, configuring the optical amplifier to operate in a second mode. In the second mode the optical amplifier applies a second gain to the optical signal so that the optical power of the optical signal is maintained at a target optical power dependent on a current plurality of optical channels in the optical signal.

Changing operating mode from the constant gain, 'open loop', first mode to the constant power, variable gain, 'closed loop', second mode at a time unique to the optical amplifier in an amplifier chain may mitigate the effect of the optical amplifier correcting an optical power/gain error, to return itself to operating at its target total optical power and gain, on one or more other optical amplifiers in the amplifier chain. This may mitigate the occurrence of optical power oscillations in an amplifier chain of which the optical amplifier forms a part.

In an embodiment, said time period is equal to a preselected time period plus an additional time period unique to the optical amplifier within the amplifier chain. This may ensure that the optical amplifier does not have its operating mode changed until after a preselected time period has elapsed, which may ensure that sufficient time is allowed for an optical power transient in the optical network to be over and the network to have reached a steady state before the optical amplifier is changed to the second operating mode.

In an embodiment, said additional time period is proportional to a position of the optical apparatus in the amplifier chain. This may enable the operating mode of the optical amplifier to be changed after a time dependent on its position within the optical amplifier chain.

In an embodiment, the optical amplifier is provided with a position number indicative of a position of the optical amplifier in the amplifier chain. The additional time period is a number of seconds proportional to a constant multiplied by the position number. This may enable the operating mode of the optical amplifier to be changed after a time dependent on its position within the optical amplifier chain.

In an embodiment, the constant is a positive number greater than zero.

In an embodiment, the additional time period is a randomly generated time period. This may enable a time period unique to the optical amplifier to be set without requiring any signalling associated with providing the optical amplifier with a position number.

A second aspect of the invention provides a method of operating a plurality of optical amplifiers arranged as an amplifier chain in an optical network. Prior to implementation of the method the optical amplifiers are each initially configured to operate in a first mode to apply a substantially constant respective first gain to an optical signal comprising a plurality of optical channels. The method comprises configuring each optical amplifier to operate in a second operating mode. In the second mode each optical amplifier applies a respective second gain to the optical signal so that the optical power of the optical signal is maintained at a target optical power dependent on a current plurality of optical channels in the optical signal. Each optical amplifier is configured to operate in the second mode after a respective time period unique to itself within the amplifier chain.

Changing operating mode of each optical amplifier from the constant gain, 'open loop', first mode to the variable gain, constant power, 'closed loop', second mode at a time unique to each optical amplifier in the amplifier chain may mitigate the occurrence of optical power oscillations in the amplifier chain as a result of the change of operating mode.

In an embodiment, each said time period is equal to a preselected time period plus an additional time period unique to the respective optical amplifier within the amplifier chain. This may enable the optical amplifiers to undergo the change of operating mode sequentially, one after the other down the amplifier chain. This may further mitigate the occurrence of optical power oscillations in the amplifier chain as a result of the change of operating mode.

In an embodiment, a first optical amplifier in the chain is configured to operate in the second mode on expiry of said preselected time period. Each subsequent optical amplifier in the chain is configured to operate in the second mode on expiry of a respective time period equal to said preselected time period plus a respective additional time period. The additional time period of each optical amplifier is unique to that optical amplifier in the amplifier chain. This may enable the optical amplifiers to undergo the change of operating mode sequentially, one after the other down the amplifier chain. This may ensure that the optical amplifiers do not change operating mode until after a preselected time period has elapsed, which may ensure that sufficient time is allowed for an optical power transient in the optical network to be over and the network to have reached a steady state before the optical amplifiers are changed to the second operating mode. This may further mitigate the occurrence of optical power oscillations in the amplifier chain as a result of the change of operating mode.

In an embodiment, each optical amplifier is provided with a position number indicative of a position of the optical amplifier in the amplifier chain. The additional time period is a number of seconds proportional to a constant multiplied by the position number. This may enable the operating mode of each optical amplifier to be changed after a time dependent on it position within the optical amplifier chain. This may enable the optical amplifiers to undergo the change of operating mode sequentially, one after the other down the amplifier chain. This may further mitigate the occurrence of optical power oscillations in the amplifier chain as a result of the change of operating mode.

In an embodiment, the constant is a positive number greater than zero.

In an embodiment, the additional time period is a randomly generated time period. This may enable a time period unique to each optical amplifier to be set without requiring any signalling associated with providing each optical amplifier with a position number.

In an embodiment, the method comprises providing each optical amplifier with its respective position number by generating an optical control signal comprising a frame comprising a position field for containing a position number. The method comprises setting the position number to an initial value for a first optical amplifier in the chain. The method comprises transmitting the optical control signal from the first optical amplifier to a subsequent optical amplifier in the chain. The method comprises, sequentially at each subsequent optical amplifier in the chain: receiving the optical control signal transmitted from a preceding optical amplifier in the chain and reading the position number; incrementing the position number by a preselected increment value and storing the incremented position number; and updating the position field with the incremented position number and retransmitting the optical control signal comprising the updated position field. This may enable each optical amplifier to be provided with its position number using simple signalling across the amplifier chain.

In an embodiment, the optical control signal is an optical service channel. In an embodiment, the service channel is one of an optical supervisory channel signal and an in-band optical signal. This may enable existing control signalling systems to be used to provide the position numbers to the optical amplifiers.

In an embodiment, the method comprises providing each optical amplifier with its respective position number during configuration of the amplifier chain.

A third aspect of the invention provides optical apparatus for an amplifier chain of an optical network. The optical apparatus comprises an optical amplifier and a controller. The optical amplifier is configured to amplify an optical signal comprising a plurality of optical channels. The controller is arranged to cause the optical amplifier to operate in one of a first mode and a second mode. In the first mode, the optical amplifier is configured to apply a substantially constant first gain to the optical signal. In the second mode, the optical amplifier is configured to apply a second gain to the optical signal so that the optical power of the optical signal is maintained at a target optical power dependent on a current plurality of optical channels in the optical signal. The controller is arranged to cause the optical amplifier to change from the first mode to the second mode after a time period unique to the optical apparatus within the amplifier chain.

Changing operating mode from the constant gain, 'open loop', first mode to the variable gain, constant power, 'closed loop', second mode at a time unique to the optical amplifier in an amplifier chain may mitigate the effect of the optical amplifier correcting an optical power/gain error, to return itself to operating at its target total optical power and gain, on one or more other optical amplifiers in the amplifier chain. This may mitigate the occurrence of optical power oscillations in an amplifier chain of which the optical amplifier forms a part.

In an embodiment, said time period is equal to a preselected time period plus an additional time period unique to the optical apparatus within the amplifier chain. This may ensure that the optical amplifier does not have its operating mode changed until after a preselected time period has elapsed, which may ensure that sufficient time is allowed for an optical power transient in the optical network to be over and the network to have reached a steady state before the optical amplifier is changed to the second operating mode.

In an embodiment, said additional time period is proportional to a position of the optical apparatus in the amplifier chain. This may enable the operating mode of the optical amplifier to be changed after a time dependent on its position within the optical amplifier chain.

In an embodiment, the controller is additionally arranged to obtain a position number indicative of the position of the optical apparatus in the amplifier chain. The controller is additionally arranged to calculate the additional time period as a number of seconds proportional to a constant multiplied by the position number. This may enable the operating mode of the optical amplifier to be changed after a time dependent on its position within the optical amplifier chain.

In an embodiment, the constant is a positive number greater than zero.

In an embodiment, the controller is additionally arranged to receive an optical control signal comprising a frame comprising a position field containing a position number, read the position number, increment the position number by a preselected increment value and update the position field with the incremented position number and store the incremented position number. The controller is additionally arranged to generate and transmit a further optical control signal having the incremented position number in the position field of the optical control signal frame. This may enable the controller to obtain and propagate the position number via simple signalling.

In an embodiment, the controller is additionally arranged to receive an optical control signal comprising a frame comprising a position field containing a position number and set the position number in the position field to an initial position number. The controller is additionally arranged to generate and transmit a further optical control signal having the initial position number in the position field of the optical control signal frame. This may enable the controller to set the position number where the optical apparatus is the first in the optical amplifier chain.

In an embodiment, said additional time period is a randomly generated time period. This may enable a time period unique to the optical amplifier to be set without requiring the signalling associated with providing the optical amplifier with a position number.

In an embodiment, the controller is additionally arranged to receive an indication of the current plurality of optical channels during the preselected time period. This may enable the controller to calculate a target optical signal power and gain for use in the second mode.

In an embodiment, the optical apparatus is one of an optical line amplifier, an optical add-drop multiplexer and an optical network node.

A fourth aspect of the invention provides an optical network comprising an optical amplifier chain. The amplifier chain comprises a plurality of optical apparatus and a plurality of optical links. Each optical apparatus comprises an optical amplifier and a controller. Each optical amplifier is configured to amplify an optical signal comprising a plurality of optical channels. Each controller is arranged to cause the respective optical amplifier to operate in one of a first mode and a second mode. In the first mode, each optical amplifier is configured to apply a substantially constant first gain to the optical signal. In the second mode, each optical amplifier is configured to apply a respective second gain to the optical signal so that the optical power of the optical signal is maintained at a target optical power dependent on a current plurality of optical channels in the optical signal. Each controller is arranged to cause the respective optical amplifier to change from the first mode to the second mode after a time period unique to the said optical apparatus within the amplifier chain. Each optical link is arranged to connect the optical amplifiers in a respective pair of said plurality of optical apparatus.

Changing operating mode from the constant gain, 'open loop', first mode to the variable gain, constant power, 'closed loop', second mode at a time unique to each optical amplifier in the amplifier chain may mitigate the occurrence of optical power oscillations in the amplifier chain.

In an embodiment, each said time period is equal to a preselected time period plus an additional time period unique to the respective optical apparatus within the amplifier chain. This may ensure that each optical amplifier does not have its operating mode changed until after a preselected time period has elapsed, which may ensure that sufficient time is allowed for an optical power transient in the optical network to be over and the network to have reached a steady state before the optical amplifiers are changed to the second operating mode.

In an embodiment, each said additional time period is proportional to a position of each optical apparatus in the amplifier chain. This may enable the operating mode of each optical amplifier to be changed after a time dependent on its position within the optical amplifier chain. This may enable the optical amplifiers to undergo the change of operating mode sequentially, one after the other down the amplifier chain. This may further mitigate the occurrence of optical power oscillations in the amplifier chain as a result of the change of operating mode.

In an embodiment, the controllers are additionally arranged to obtain a position number indicative of the position of the respective optical apparatus in the amplifier chain. Each controller is additionally arranged to calculate the additional time period as a number of seconds proportional to a constant multiplied by the position number. This may enable the operating mode of each optical amplifier to be changed after a time dependent on its position within the optical amplifier chain. This may enable the optical amplifiers to undergo the change of operating mode sequentially, one after the other down the amplifier chain. This may further mitigate the occurrence of optical power oscillations in the amplifier chain as a result of the change of operating mode.

In an embodiment, the constant is a positive number greater than zero.

In an embodiment, each controller is additionally arranged to receive an optical control signal comprising a frame comprising a position field containing a position number, read the position number, increment the position number by a preselected increment value and update the position field with the incremented position number and store the incremented position number. Each controller is additionally arranged to generate and transmit a further optical control signal having its incremented position number in the position field of the optical control signal frame. This may enable the controllers to obtain and propagate the position numbers via simple signalling.

In an embodiment, the controller of a first optical apparatus in the amplifier chain is additionally arranged to receive an optical control signal comprising a frame comprising a position field containing a position number and set the position number in the position field to an initial position number. The controller is additionally arranged to generate and transmit a further optical control signal having the initial position number in the position field of the optical control signal frame. This may enable the controller to set the position number where the optical apparatus and propagate the initial position number to the next optical apparatus in the optical amplifier chain.

In an embodiment, said additional time period is a randomly generated time period. This may enable a time period unique to each optical amplifier to be set without requiring the signalling associated with providing each optical amplifier with a position number.

In an embodiment, each controller is additionally arranged to receive an indication of the current plurality of optical channels during the preselected time period. This may enable the controllers to calculate a target optical signal power and gain for use in the second mode.

In an embodiment, the optical apparatus is one of an optical line amplifier, an optical add-drop multiplexer and an optical network node.

In an embodiment, the optical network additionally comprises network control apparatus arranged to generate and transmit said optical control signal to a first one of the optical apparatus in the amplifier chain.

A fifth aspect of the invention provides a data carrier having computer readable instructions embodied therein. The said computer readable instructions are for providing access to resources available on a processor and the computer readable instructions comprising instructions to cause the processor to perform any of the above steps of the method of changing operating mode of an optical amplifier in an amplifier chain in an optical network.

In an embodiment, the data carrier is a non-transitory data carrier.

A sixth aspect of the invention provides a data carrier having computer readable instructions embodied therein. The said computer readable instructions being for providing access to resources available on a processor and the computer readable instructions comprising instructions to cause the processor to perform any of the above steps of the method of changing operating mode of a plurality of optical amplifiers arranged as an amplifier chain in an optical network.

In an embodiment, the data carrier is a non-transitory data carrier.

A seventh aspect of the invention provides a method of providing each of a plurality of optical amplifiers arranged in an optical amplifier chain in an optical network with a respective position number. The method comprises generating an optical control signal comprising a frame comprising a position field for containing a position number. The method comprises setting the position number to an initial value for a first optical amplifier in the chain. The method comprises transmitting the optical control signal from the first optical amplifier to a subsequent optical amplifier in the chain. The method comprises, sequentially at each subsequent optical amplifier in the chain: receiving the optical control signal transmitted from a preceding optical amplifier in the chain and reading the position number; incrementing the position number by a preselected increment value and store the incremented position number; and updating the position field with the incremented position number and retransmitting the optical control signal comprising the updated position field.

This may enable each optical amplifier to be provided with its position number using simple signalling across the amplifier chain.

In an embodiment, the optical control signal is an optical service channel. In an embodiment, the service channel is one of an optical supervisory channel signal and an in-band optical signal. This may enable existing control signalling systems to be used to provide the position numbers to the optical amplifiers.

In an embodiment, the method comprises providing each optical amplifier with its respective position number during configuration of the amplifier chain.

An eighth aspect of the invention provides an optical amplifier controller. The optical amplifier controller is arranged to receive an optical control signal comprising a frame comprising a position field containing a position number. The optical amplifier controller is additionally arranged to read the position number, increment the position number by a preselected increment value and store the incremented position number. The optical amplifier controller is additionally arranged to update the position field with the incremented position number and to generate and transmit a further optical control signal having the incremented position number in the position field of the optical control signal frame.

This may enable the controller to obtain and propagate a position number via simple signalling.

In an embodiment, the controller is additionally arranged to receive an optical control signal comprising a frame comprising a position field containing a position number and set the position number in the position field to an initial position number. The controller is additionally arranged to generate and transmit a further optical control signal having the initial position number in the position field of the optical control signal frame. This may enable the controller to set the position number where the optical amplifier being controlled is the first in the optical amplifier chain.

Embodiments of the invention will now be described, by way of example only, with reference to the accompanying drawings.

DETAILED DESCRIPTION

Figure 1:
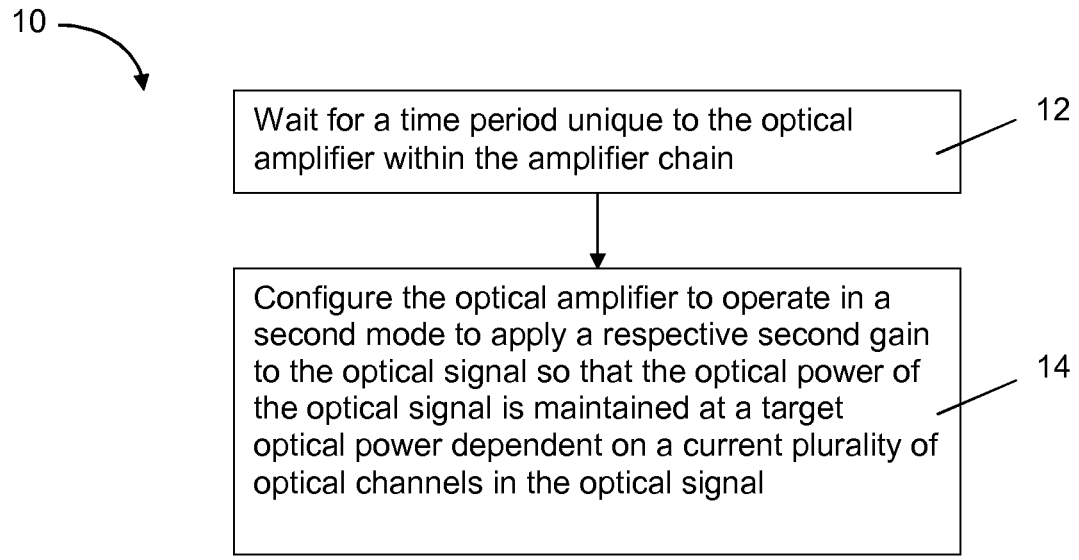
FIG. 1 shows the steps of a method according to a first embodiment of the invention of changing operating mode of an optical amplifier in an amplifier chain in an optical network.

Referring to FIG. 1, a first embodiment of the invention provides a method 10 of changing operating mode of an optical amplifier in an amplifier chain in an optical network.

The optical amplifier is initially configured, before the method 10 is applied, to operate in a first mode in which it applies a substantially constant first gain to an optical signal comprising a plurality of optical channels. This first mode is also known as 'open loop' operation.

The method 10 comprises, after a time period unique to the optical amplifier within the amplifier chain 12, configuring the optical amplifier to operate in a second mode 14. In the second mode the optical amplifier applies a second gain to the optical signal so that the optical power of the optical signal is maintained at a target optical power dependent on a current plurality of optical channels in the optical signal. This second mode is also known as constant power or 'closed loop' operation, in which a gain control loop operates to maintain the optical power of the signal output from the optical amplifier at the target optical power. It will be understood by the person skilled in the art that this means that the second gain may vary where the optical power of the optical signal at the input of the optical amplifier changes in order to maintain the output optical power of the optical signal at the target optical power.

The target optical power is dependent on the current plurality of optical channels in the optical signal, that is the number of optical channels present in the optical signal when the optical amplifier enters the second mode.

It will be understood that the time period is unique to the optical amplifier within the amplifier chain of which it forms a part, so another optical amplifier in a different amplifier chain could have the same time period, unique to that optical amplifier within its respective amplifier chain.

Figure 2:
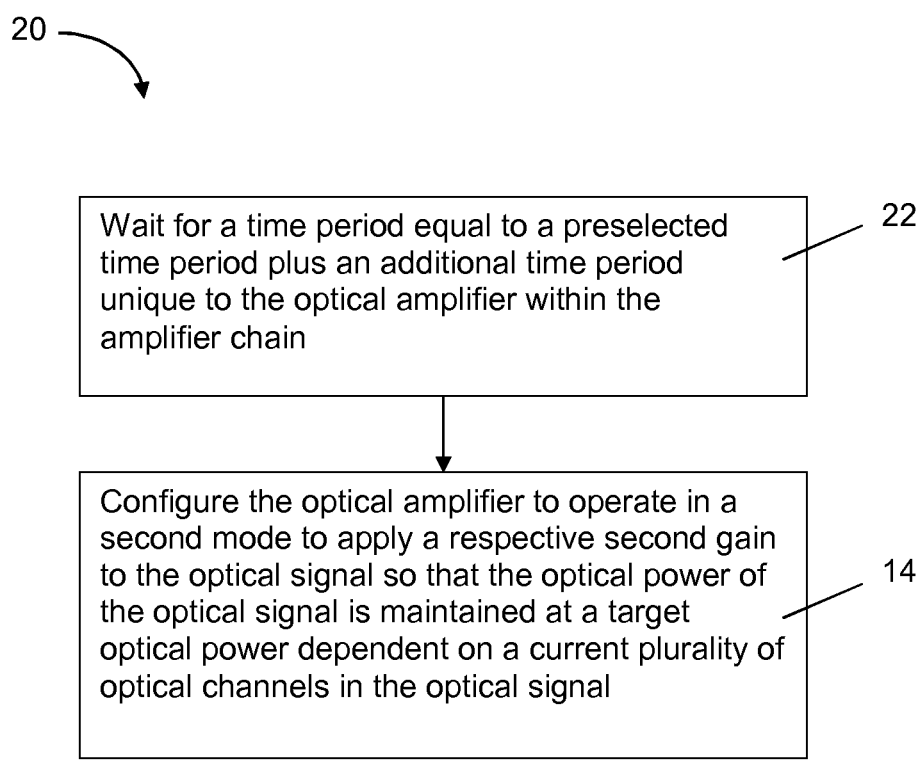
FIG. 2 shows the steps of a method according to a second embodiment of the invention of changing operating mode of an optical amplifier in an amplifier chain in an optical network.

Referring to FIG. 2, a second embodiment of the invention provides a method 20 of changing operating mode of an optical amplifier in an amplifier chain in an optical network which is similar to the method 10 shown FIG. 1, with the following modifications.

In this embodiment, the method 20 comprises waiting for a time period is equal to a preselected time period plus an additional time period. The additional time period is unique to the optical amplifier within the amplifier chain 22.

Figure 3:
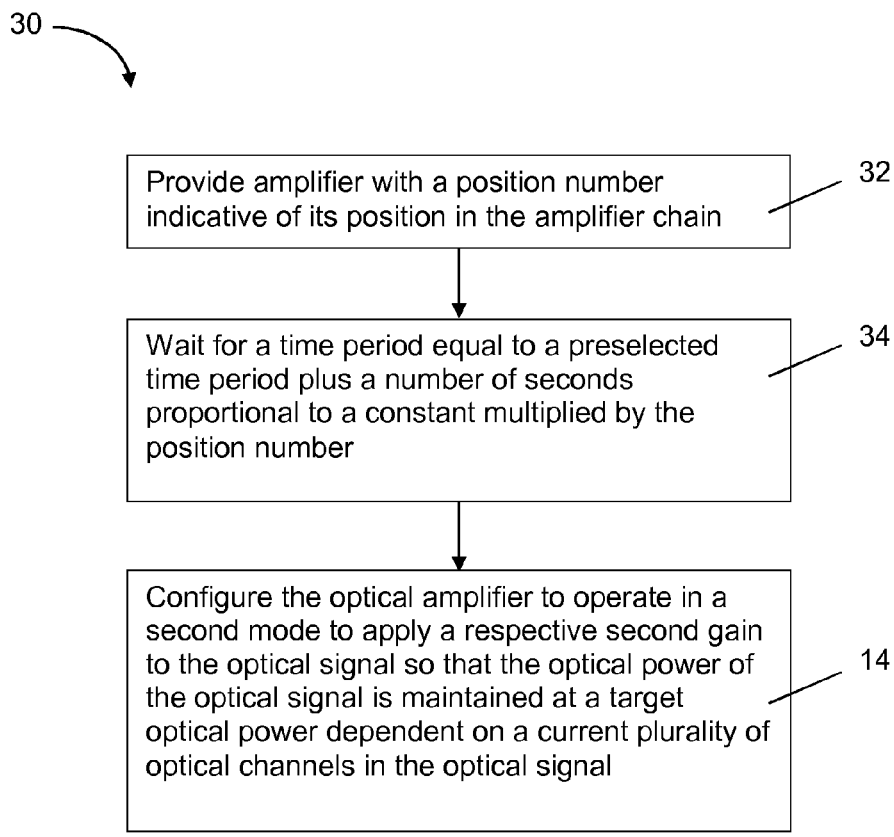
FIG. 3 shows the steps of a method according to a third embodiment of the invention of changing operating mode of an optical amplifier in an amplifier chain in an optical network.

Referring to FIG. 3, a third embodiment of the invention provides a method 30 of changing operating mode of an optical amplifier in an amplifier chain in an optical network which is similar to the method 10 shown FIG. 1, with the following modifications.

In this embodiment, the method 30 comprises providing the optical amplifier with a position number indicative of a position of the optical amplifier in the amplifier chain 32. The method comprises waiting for a time period is equal to a preselected time period plus an additional time period. The additional time period is a number of seconds proportional to a constant multiplied by the position number 34.

Figure 4:
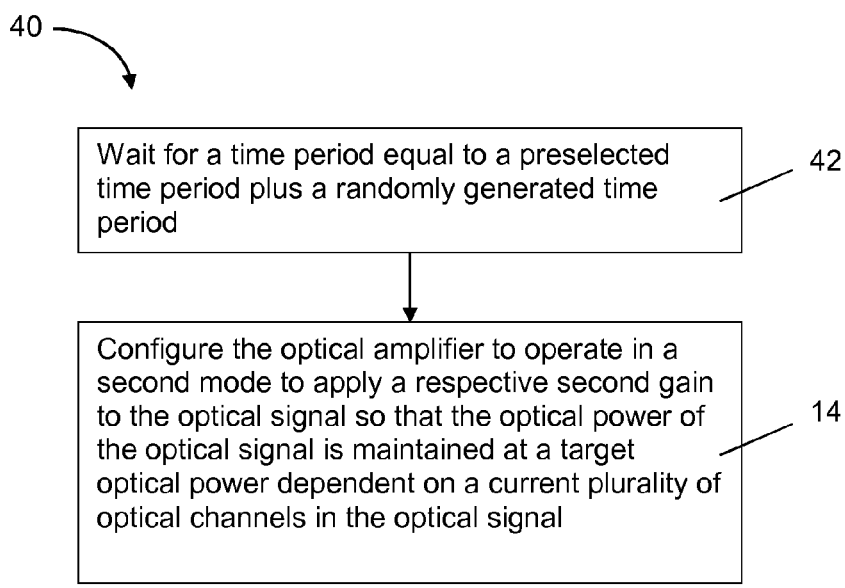
FIG. 4 shows the steps of a method according to a fourth embodiment of the invention of changing operating mode of an optical amplifier in an amplifier chain in an optical network.

Referring to FIG. 4, a fourth embodiment of the invention provides a method 40 of changing operating mode of an optical amplifier in an amplifier chain in an optical network which is similar to the method 10 shown FIG. 1, with the following modifications.

In this embodiment, the method 40 comprises waiting for a time period is equal to a preselected time period plus an additional time period. The additional time period is a randomly generated time period 42.

Figure 5:
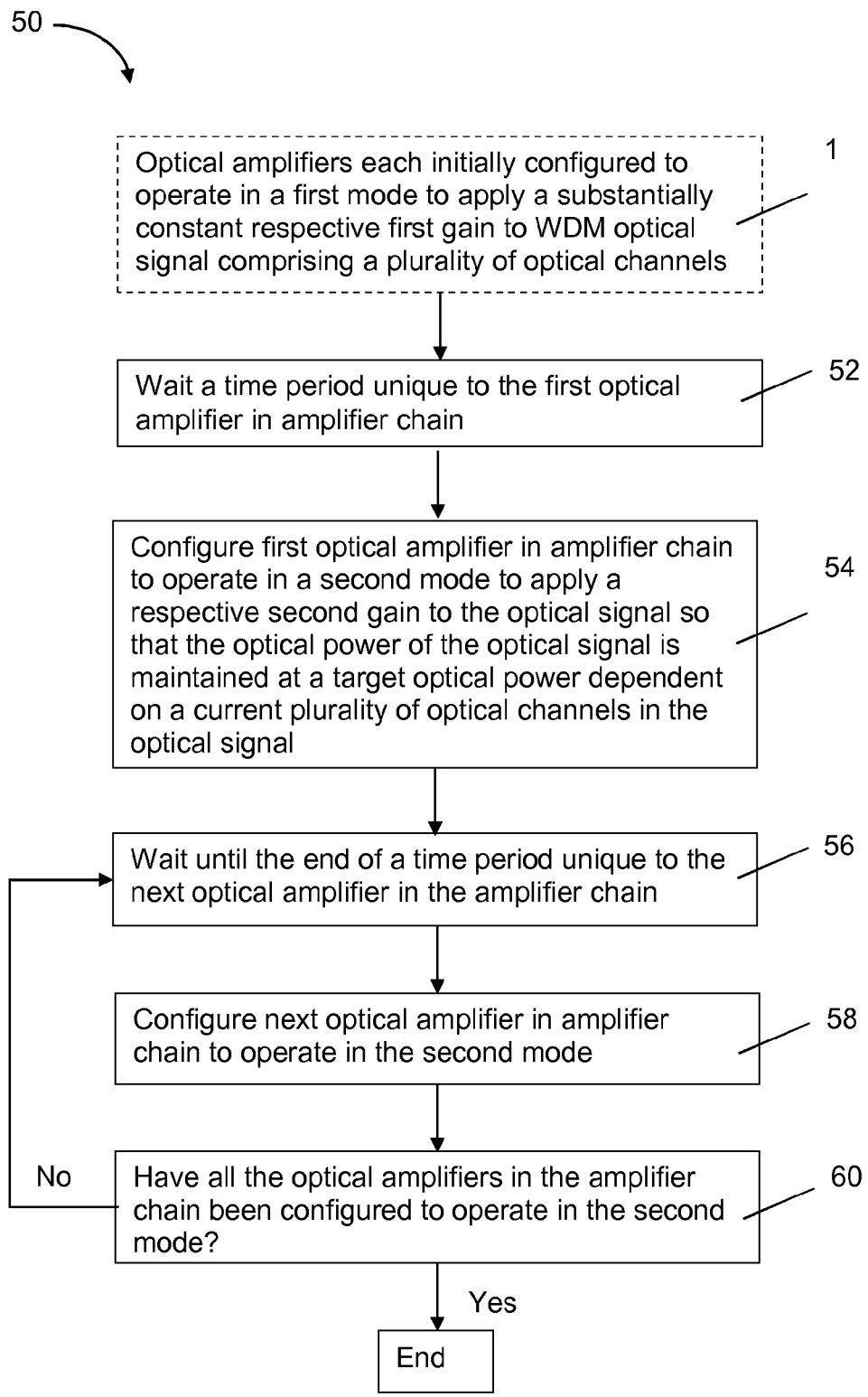
FIG. 5 shows the steps of a method according to a fifth embodiment of the invention of operating a plurality of optical amplifiers arranged as an amplifier chain in an optical network.

Referring to FIG. 5, a fifth embodiment of the invention provides a method 50 of operating a plurality of optical amplifiers arranged as an amplifier chain in an optical network.

The optical amplifiers are each initially configured to operate in a first mode, before the method 50 is applied. In the first mode, the optical amplifiers are each configured to apply a substantially constant respective first gain to an optical signal comprising a plurality of optical channels 1.

The method 50 comprises configuring each optical amplifier to operate in a second operating mode after a respective time period unique to that optical amplifier within the amplifier chain 52, 54, 56, 58, 60. In the second mode each optical amplifier applies a respective second gain to the optical signal so that the optical power of the optical signal is maintained at a target optical power dependent on a current plurality of optical channels in the optical signal. This second mode is also known as constant power or 'closed loop' operation, in which a gain control loop operates to maintain the optical power of the signal output from the optical amplifier at the target optical power. It will be understood by the person skilled in the art that this means that the second gain applied by each optical amplifier may vary where the optical power of the optical signal at the input of a respective optical amplifier changes in order to maintain the output optical power of the optical signal at the target optical power.

The method 50 comprises waiting for a time period unique to a first optical amplifier in the optical amplifier chain 52 and then configuring the first optical amplifier to operate in the second mode, to apply a respective second gain to the optical signal 54. After the end of a time period unique to the next optical amplifier in the chain 56 the method then proceeds to configuring that optical amplifier to operate in the second mode, applying its respective second gain to the optical signal 58. If all of the optical amplifiers in the chain have been configured to operate in the second mode 60, the method ends. If not, the method continues, and after the end of the time period unique to the next optical amplifier in the chain 56 and that optical amplifier is configured to operate in the second mode 58, and so on until all the optical amplifiers in the amplifier chain have been configured to operate in the second mode. The time periods are managed in parallel for each optical amplifier, so no communication or coordination is required between the optical amplifiers regarding the respective time periods.

Figure 6:
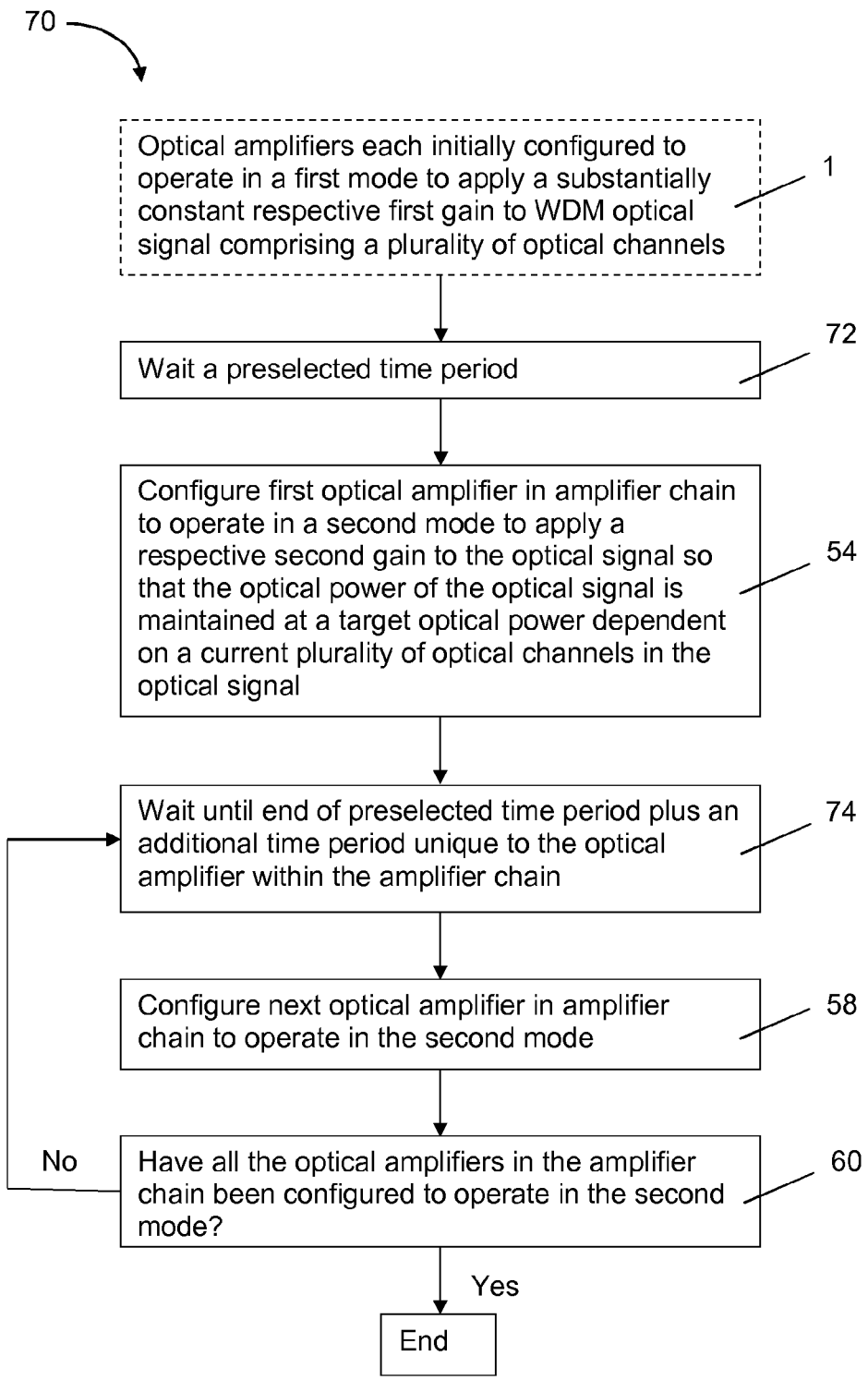
FIG. 6 shows the steps of a method according to a sixth embodiment of the invention of operating a plurality of optical amplifiers arranged as an amplifier chain in an optical network.

Referring to FIG. 6, a sixth embodiment of the invention provides a method 70 of operating a plurality of optical amplifiers arranged as an amplifier chain in an optical network. The method 70 of this embodiment is similar to the method 50 of the previous embodiment, described with reference to FIG. 5, with the following modifications. The same reference numbers are retained for corresponding steps.

In this embodiment, the method 70 commences with waiting for a preselected time period 72. The first optical amplifier in the amplifier chain is configured to operate in the second mode on expiry of the preselected time period 72.

After the preselected time period plus an additional time period unique to the next optical amplifier in the amplifier chain 74 the method then proceeds with configuring that optical amplifier to operate in the second mode 58, as so on until all of the optical amplifiers in the amplifier chain have been configured. Therefore, after the first optical amplifier, each subsequent optical amplifier in the chain is configured to operate in the second mode on expiry of a respective time period equal to the preselected time period plus a respective additional time period unique to that optical amplifier in the amplifier chain 74.

Figure 7:
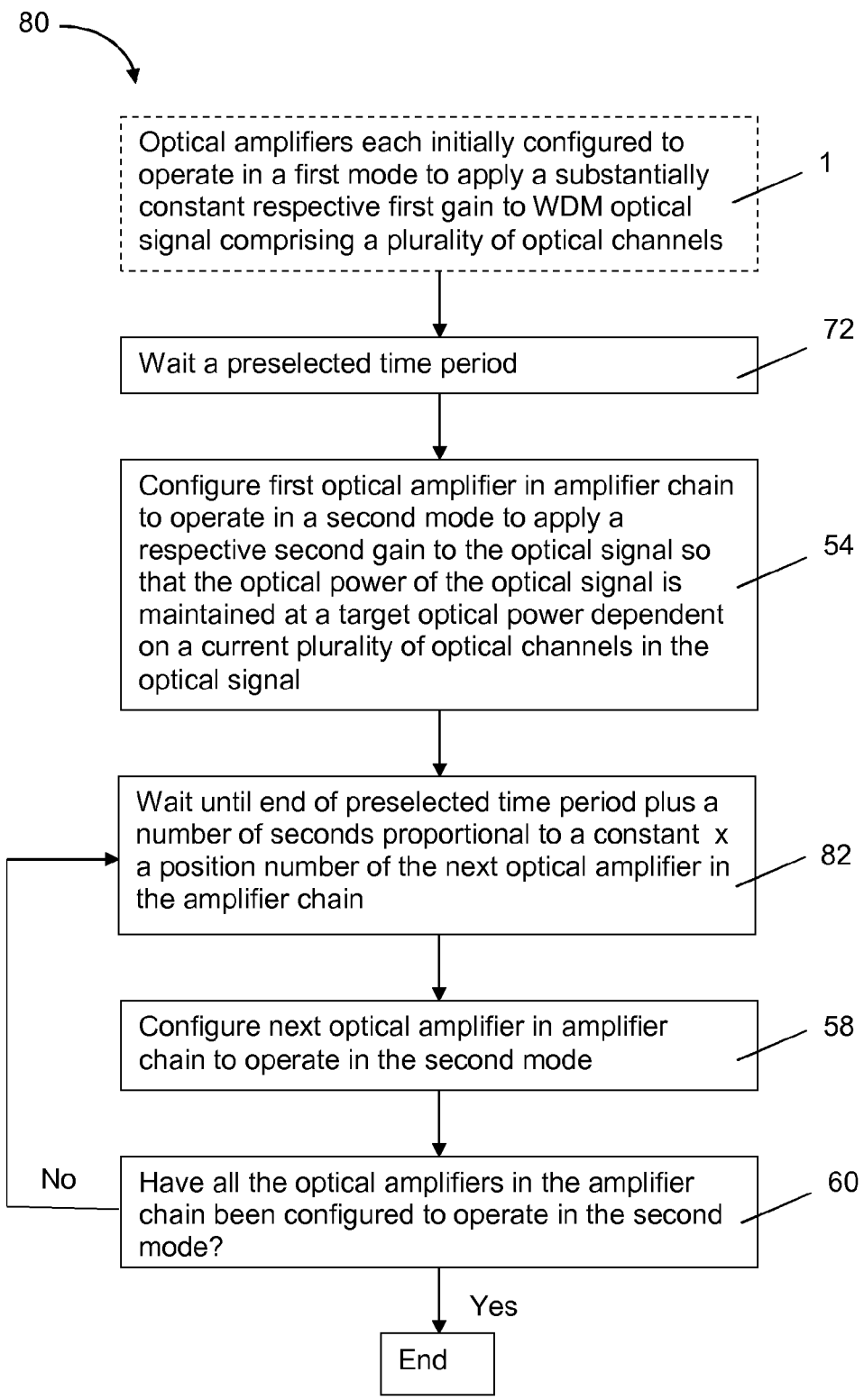
FIG. 7 shows the steps of a method according to a seventh embodiment of the invention of operating a plurality of optical amplifiers arranged as an amplifier chain in an optical network.

Referring to FIG. 7, a seventh embodiment of the invention provides a method 80 of operating a plurality of optical amplifiers arranged as an amplifier chain in an optical network. The method 80 of this embodiment is similar to the method 70 of the previous embodiment, described with reference to FIG. 6, with the following modifications. The same reference numbers are retained for corresponding steps.

In this embodiment, each optical amplifier has a position number. The first optical amplifier is configured after a preselected time period 72. Each subsequent optical amplifier in the chain is configured to operate in the second mode on expiry of a respective time period unique to it, being the preselected time period plus a respective additional time period unique to the optical amplifier in the amplifier chain. The respective additional time period for each optical amplifier is a number of seconds proportional to a constant multiplied by its position number 82.

Figure 8:
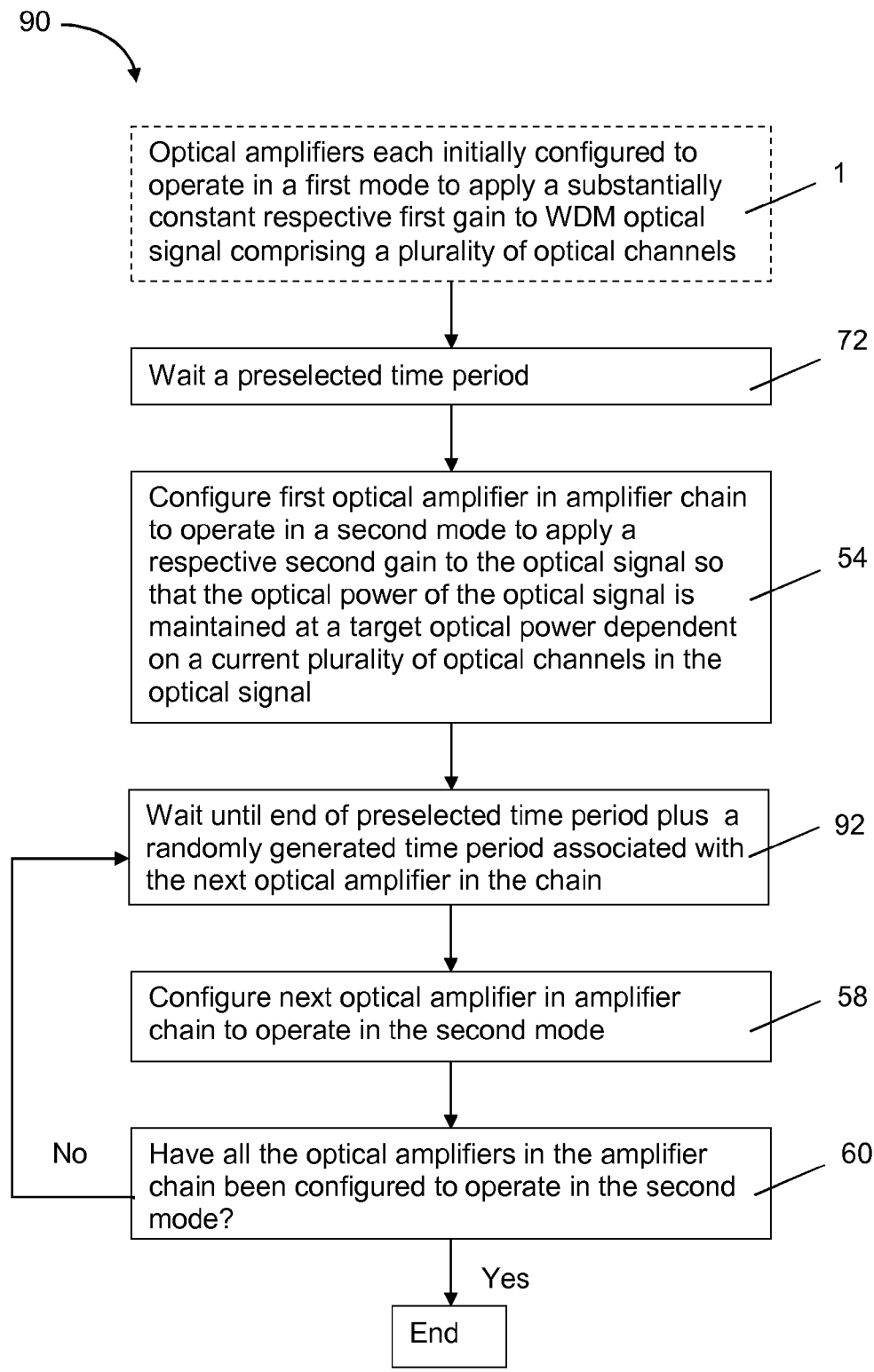
FIG. 8 shows the steps of a method according to an eighth embodiment of the invention of operating a plurality of optical amplifiers arranged as an amplifier chain in an optical network.

Referring to FIG. 8, an eighth embodiment of the invention provides a method 90 of operating a plurality of optical amplifiers arranged as an amplifier chain in an optical network. The method 90 of this embodiment is similar to the method 70 of the embodiment described with reference to FIG. 6, with the following modifications. The same reference numbers are retained for corresponding steps.

In this embodiment, the respective additional time period for each optical amplifier is a randomly generated time period 92. The probability that two or more of the optical amplifiers will have the same randomly generated time period is low.

Figure 9:
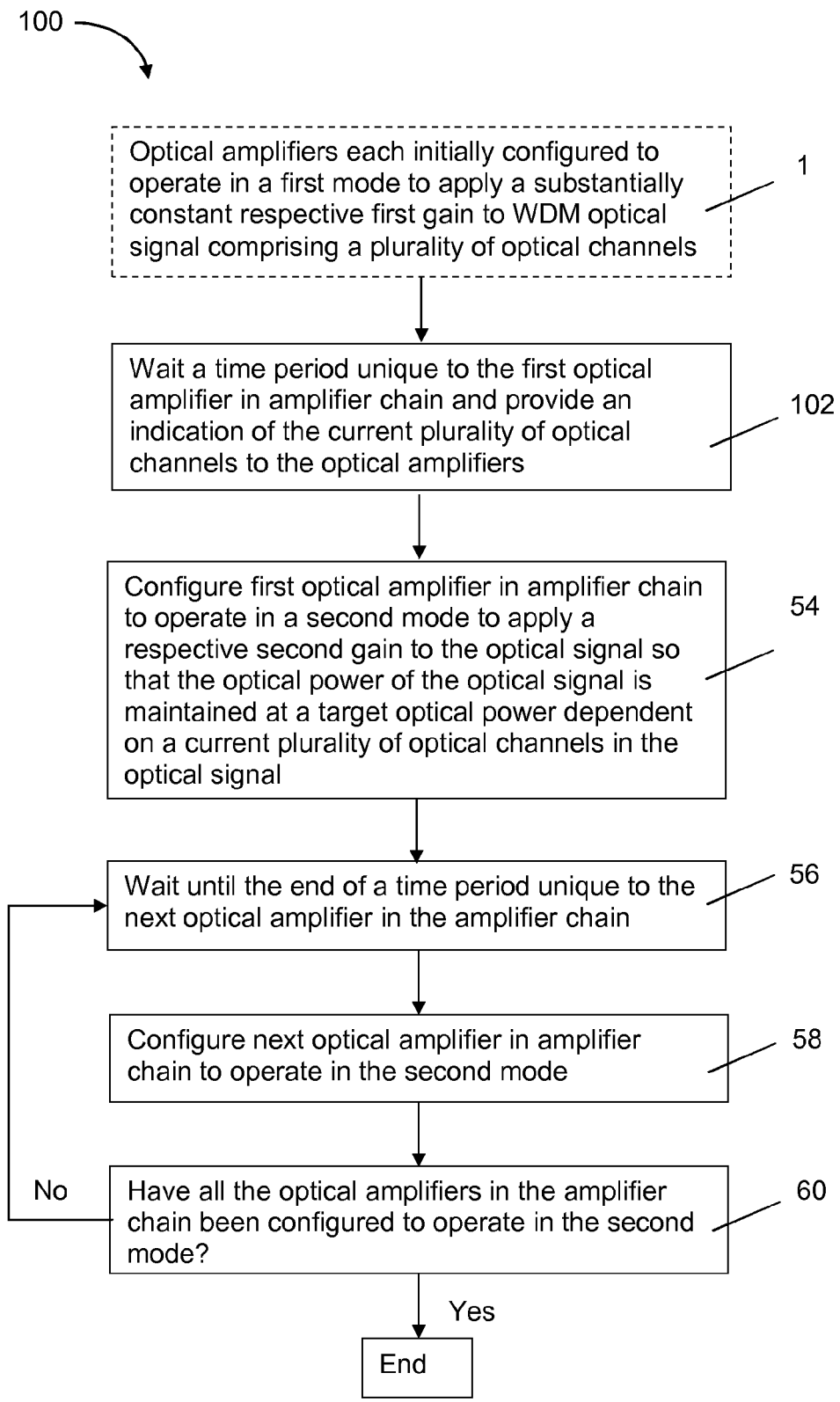
FIG. 9 shows the steps of a method according to a ninth embodiment of the invention of operating a plurality of optical amplifiers arranged as an amplifier chain in an optical network.

Referring to FIG. 9, a ninth embodiment of the invention provides a method 100 of operating a plurality of optical amplifiers arranged as an amplifier chain in an optical network. The method 100 of this embodiment is similar to the method 50 of the embodiment described with reference to FIG. 5, with the following modifications. The same reference numbers are retained for corresponding steps.

In this embodiment, the method 100 additionally comprises providing an indication of the current plurality of optical channels in the optical signal to each of the optical amplifiers 102. This is done during the time period unique to the first optical amplifier.

Figure 10:
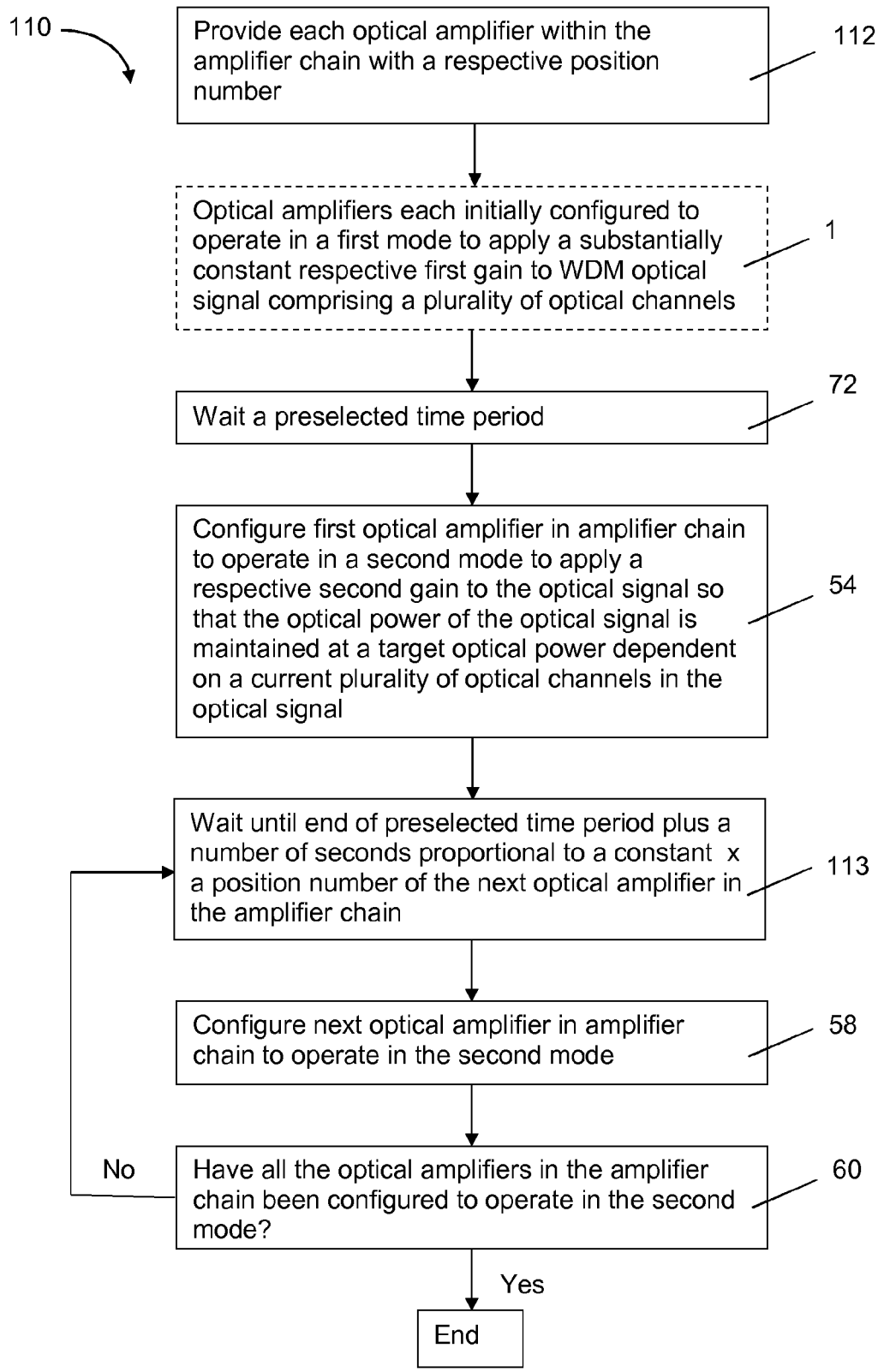
FIG. 10 shows the steps of a method according to a tenth embodiment of the invention of operating a plurality of optical amplifiers arranged as an amplifier chain in an optical network.
Figure 11:
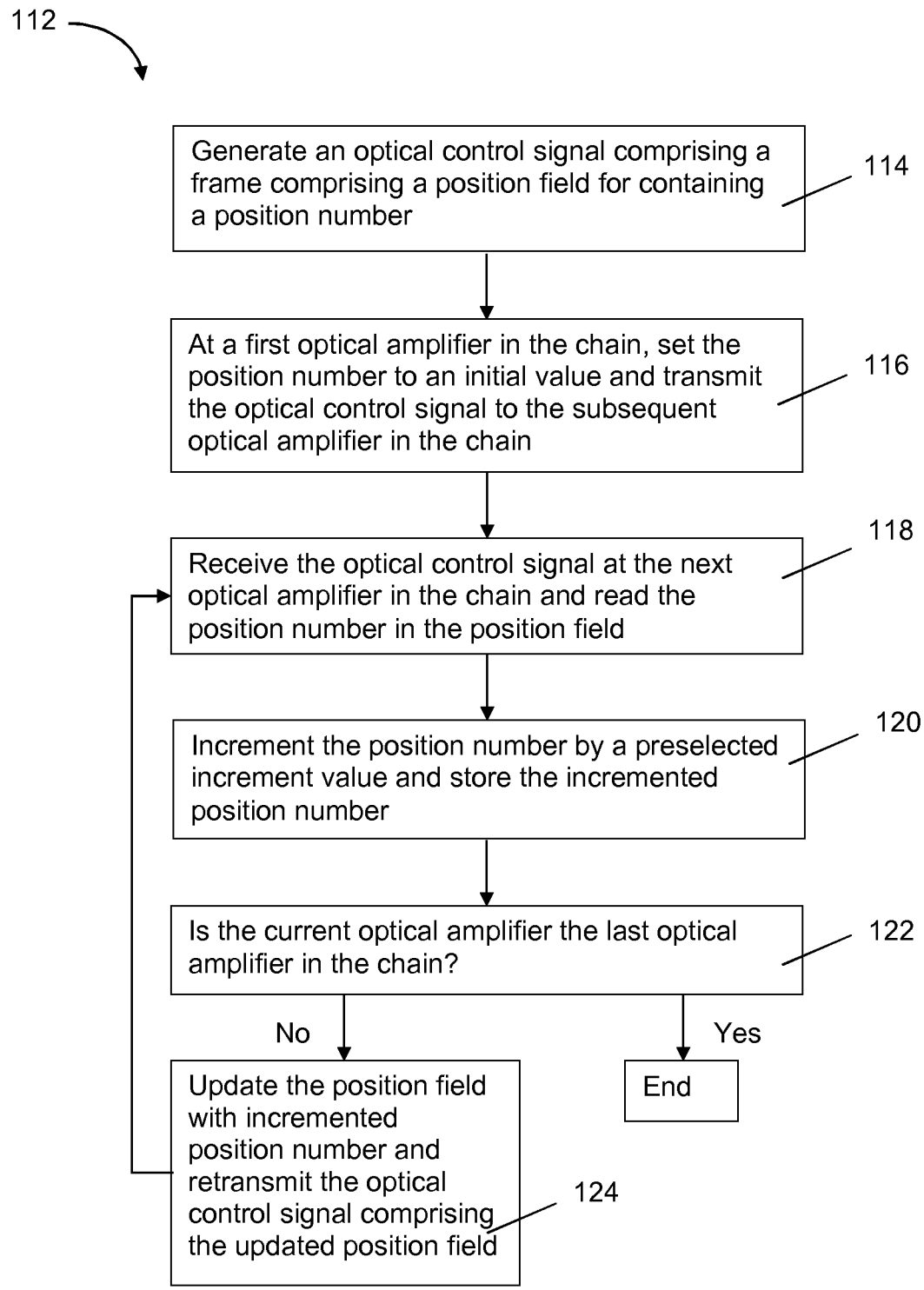
FIG. 11 shows the steps of the method of FIG. 11 of providing each optical amplifier within the amplifier chain with a respective position number.

Referring to FIGS. 10 and 11, a tenth embodiment of the invention provides a method 110 of operating a plurality of optical amplifiers arranged as an amplifier chain in an optical network. The method 110 of this embodiment is similar to the method 70 of the embodiment described with reference to FIG. 6, with the following modifications. The same reference numbers are retained for corresponding steps.

In this embodiment, the method comprises an initial step of providing each optical amplifier within the amplifier chain with a respective position number 112. The respective additional time period for each optical amplifier is a number of seconds proportional to a constant multiplied by its position number 113.

The initial step of providing each optical amplifier within the amplifier chain with a respective position number 112 comprises generating an optical control signal 114. The optical control signal comprises a frame comprising a position field for containing a position number. The position number is set to an initial value for a first optical amplifier in the chain 116. The optical control signal is then transmitted from the first optical amplifier to the next optical amplifier in the chain 116, where it is received and the position number read 118. The position number is incremented by a preselected increment value and the incremented position number is stored 120. If the current optical amplifier is the last one in the chain 122 the method ends, if not, the position field in the optical control signal is updated with the incremented position number and the updated optical control signal is retransmitted, that is to say it is regenerated and transmitted. The method then recommences with the next optical amplifier in the chain receiving the optical control signal 118, reading the position number, incrementing the position number and storing the incremented position number 120, updating the position field with the incremented position number and retransmitting the optical control signal comprising the updated position field 124, and so on until the last optical amplifier in the chain is reached.

An eleventh embodiment of the invention provides a method of operating a plurality of optical amplifiers arranged as an amplifier chain in an optical network which is similar to the method 110 of the previous embodiment.

In this embodiment, the optical control signal is an optical service channel in the form of an optical supervisory channel, OSC, signal and the position field is provided in the OSC frame. Alternatively, the optical control signal may be an in-band optical signal.

In this embodiment, the first optical amplifier in the chain is an optical add-drop multiplexer, OADM, which may be a reconfigurable OADM, ROADM, or is an optical network terminal. Each of the other optical amplifiers is an optical line amplifier, OLA. The position number of the OADM is set as zero, then the position field is incremented by 1 and propagated across the OLA chain, with each OLA reading the position number in the position field to identify its position and incrementing the position number by 1. It will be appreciated that the method is applied in each direction across an optical link, so each OLA knows its position number for optical signals propagating in both directions.

The OLAs are configured to operate in the second mode, 'closed loop', after a delay proportional to their position number. In this embodiment:

$$\text{Delay (seconds)}=k\times\text{position number}$$

Where k=1, the $1^{st}$ amplifier in the chain will change from operating in the first mode, 'open loop', to the second mode after 1 second, the $2^{nd}$ after 2 seconds, the $3^{rd}$ after 3 seconds, and so on.

Figure 12:
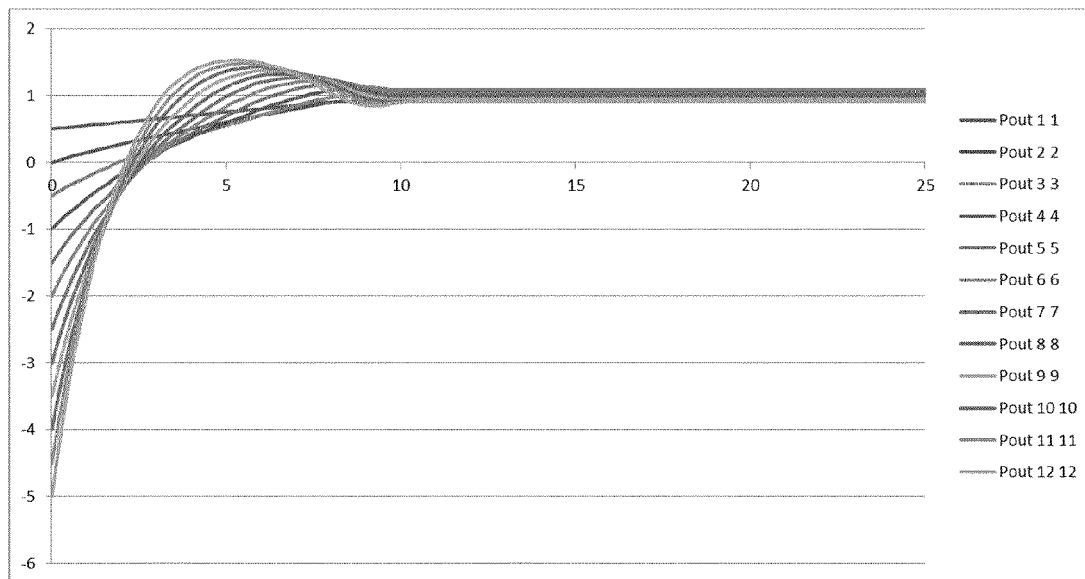
FIG. 12 shows the variation in optical signal power at each optical amplifier in a chain of twelve optical amplifiers when the operating mode of each amplifier is changed from the first mode to the second mode at the same time.

FIG. 12 shows simulated variation in optical signal power (dBm, y-axis) as a function of time (x-axis) at each optical amplifier in a chain of twelve optical amplifiers when the operating mode of each amplifier is changed from the first mode (open loop', constant gain) to the second mode (closed loop', constant power, variable gain) at the same time. The simulation assumes an output optical signal power error of 0.5 dB at each optical amplifier. As can be seen, when each optical amplifier operates at the same time to correct the error, to bring the optical signal power to the target power, an oscillation on the output optical signal power is generated for each of optical amplifiers 4 to 12 before the optical signal powers settles down to the target of 1 dBm (10 mW).

Figure 13:
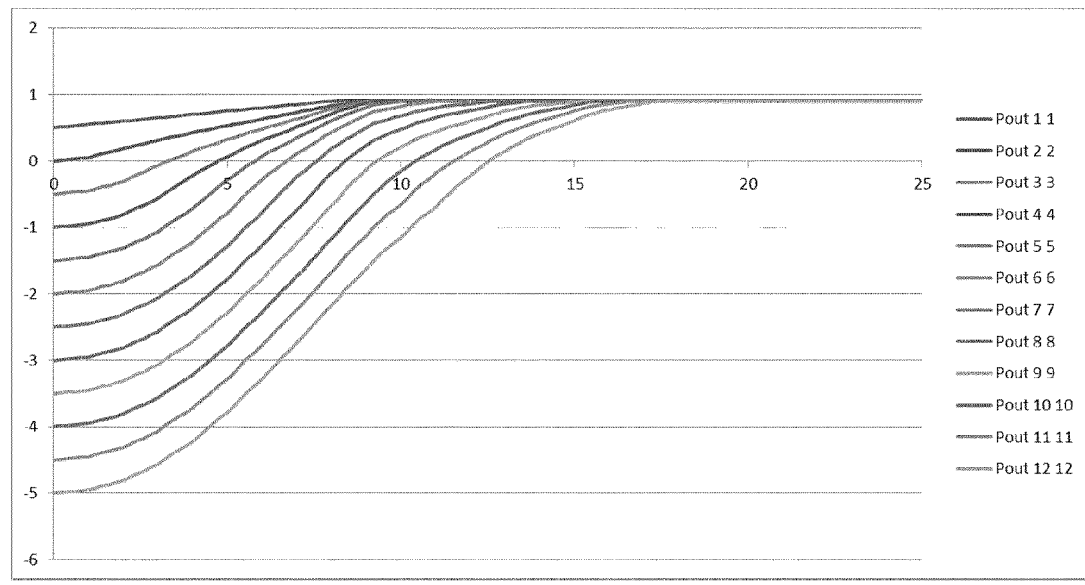
FIG. 13 shows the variation in optical signal power at each optical amplifier in a chain of twelve optical amplifiers when the operating mode of each amplifier is changed according to the method of any of FIGS. 5 to 10.

FIG. 13 shows simulated variation in optical signal power (dBm, y-axis) as a function of time (x-axis) at each optical amplifier in a chain of twelve optical amplifiers when the operating mode of each amplifier is changed from the first mode (open loop', constant gain) to the second mode (closed loop', constant power, variable gain) applying the method 80 shown in FIG. 7. The constant is 1, therefore a 1 second delay is applied between each optical amplifier in the chain being configured to operate in the second mode. The simulation again assumes an output optical signal power error of 0.5 dB at each optical amplifier. As can be seen, there is a smooth, monotonic increase in the output optical signal power from each optical amplifier as they increase their output optical signal powers towards the 1 dBm target power.

Figure 14:
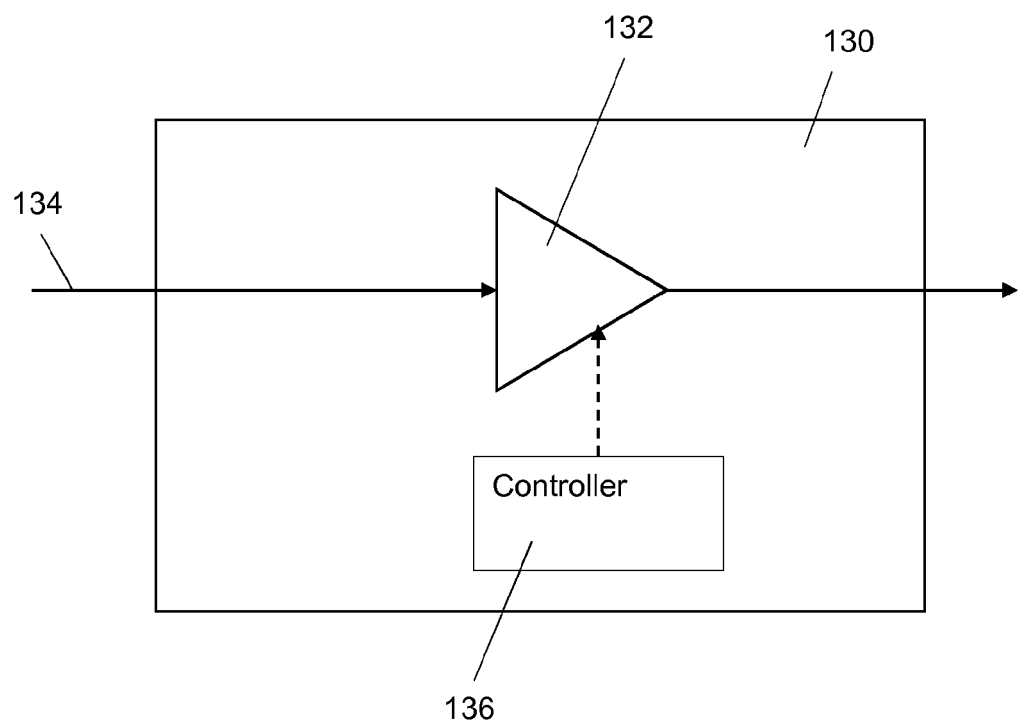
FIG. 14 is a schematic representation of optical apparatus for an amplifier chain of an optical network according to a twelfth embodiment of the invention.

Referring to FIG. 14, a twelfth embodiment of the invention provides optical apparatus 130 for an amplifier chain of an optical network. The optical apparatus comprises an optical amplifier 132 and a controller 136.

The optical amplifier 132 is configured to amplify an optical signal 134 comprising a plurality of optical channels.

The controller 136 is arranged to cause the optical amplifier to operate in one of a first mode and a second mode. In the first mode, the optical amplifier 132 is configured to apply a substantially constant first gain to the optical signal, operating in a 'closed loop' condition. In the second mode, the optical amplifier 132 is configured to apply a second gain to the optical signal so that the optical power of the optical signal is maintained at a target optical power. This is known as an 'open loop' condition. The target optical power is dependent on the current plurality of optical channels in the optical signal.

The controller is arranged to cause the optical amplifier to change from the first mode to the second mode after a time period unique to the optical apparatus within the amplifier chain in which it is to be located.

A thirteenth embodiment of the invention provides optical apparatus having the same structure as the optical apparatus 130 shown in FIG. 14. In this embodiment, the controller is arranged to cause the optical amplifier to change from the first mode to the second mode after a time period equal to a preselected time period plus an additional time period. The additional time period is unique to the optical apparatus within the amplifier chain in which it is to be located.

A fourteenth embodiment of the invention provides optical apparatus having the same structure as the optical apparatus 130 shown in FIG. 14. In this embodiment, the controller is arranged to cause the optical amplifier to change from the first mode to the second mode after a time period equal to a preselected time period plus an additional time period. The additional time period is proportional to a position of the optical apparatus within the amplifier chain in which it is to be located.

A fifteenth embodiment of the invention provides optical apparatus having the same structure as the optical apparatus 130 shown in FIG. 14. In this embodiment, the controller is arranged to cause the optical amplifier to change from the first mode to the second mode after a time period equal to a preselected time period plus an additional time period. The additional time period is a randomly generated time period.

Figure 15:
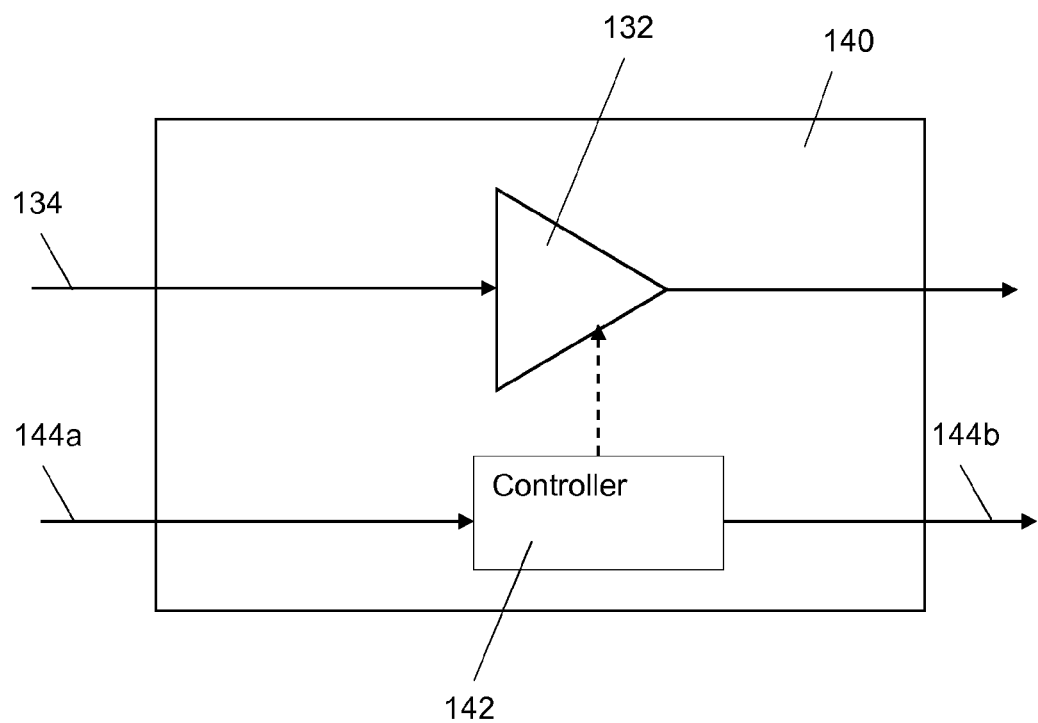
FIG. 15 is a schematic representation of optical apparatus for an amplifier chain of an optical network according to a sixteenth embodiment of the invention.

Referring to FIG. 15, a sixteenth embodiment of the invention provides optical apparatus 140 for an amplifier chain of an optical network. The optical apparatus 140 of this embodiment is similar to the optical apparatus 130 shown in FIG. 14, with the following modifications. The same reference numbers are retained for corresponding features. In this embodiment, the controller 142 is additionally arranged to receive an optical control signal 144a. The optical control signal comprises a frame comprising a position field containing a position number. The controller 142 is arranged to read the position number, increment the position number by a preselected increment value, update the position field with the incremented position number and store the incremented position number. The controller 142 is additionally arranged to generate and transmit a further optical control signal 144b having the incremented position number in the position field of the optical control signal frame.

A seventeenth embodiment of the invention provides optical apparatus having the same structure as the optical apparatus 140 shown in FIG. 15. In this embodiment, the optical control signal is an optical service channel, which is one of an OSC signal and an in-band optical signal.

An eighteenth embodiment of the invention provides optical apparatus having the same structure as the optical apparatus 140 shown in FIG. 15. In this embodiment, the controller 142 is additionally arranged to receive an indication of the current plurality of optical channels during the preselected time period.

Figure 16:
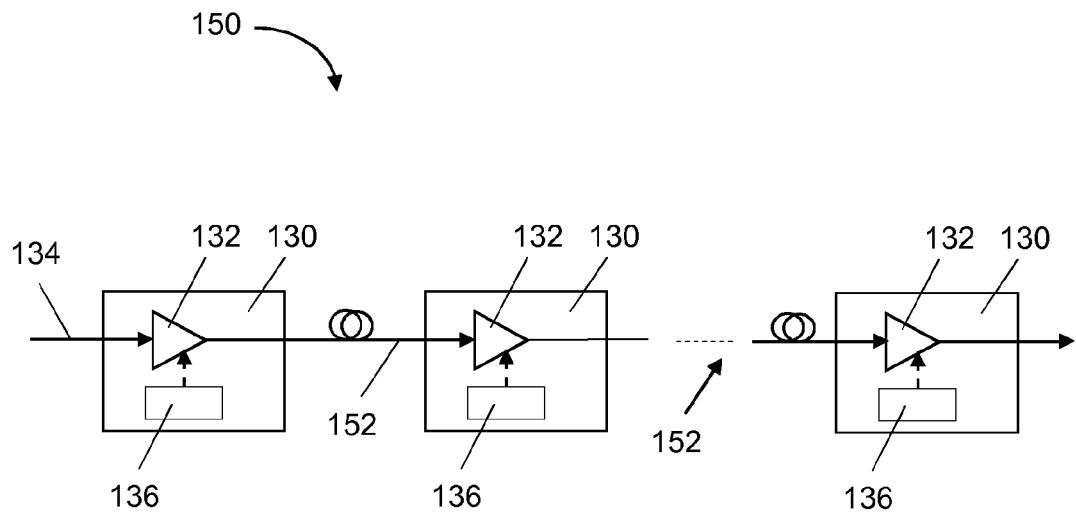
FIG. 16 is a schematic representation of an amplifier chain of an optical network according to a nineteenth embodiment of the invention.

Referring to FIG. 16, a nineteenth embodiment of the invention provides an optical network 150 comprising an optical amplifier chain. The optical amplifier chain comprises a plurality of optical apparatus 130 and a plurality of optical links 152.

The optical apparatus 130 are as described above in any of the twelfth to fifteenth embodiments of the invention and shown in FIG. 14. Each optical link 152 connects the optical amplifiers in a respective pair of optical apparatus 130.

Figure 17:
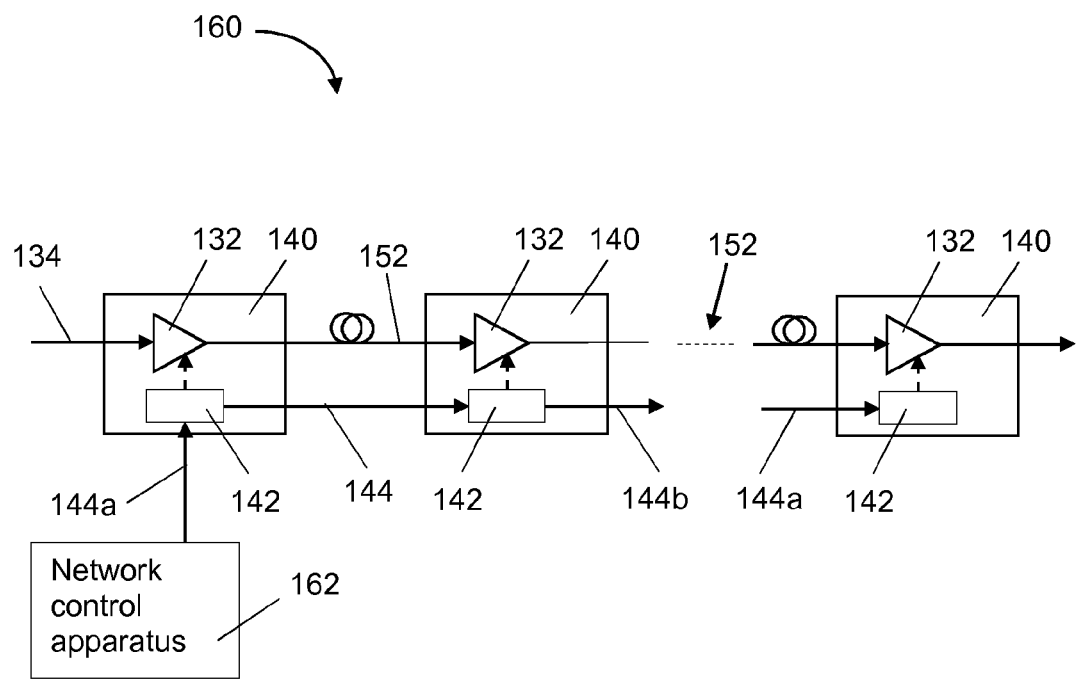
FIG. 17 is a schematic representation of an amplifier chain of optical network according to a twentieth embodiment of the invention.

Referring to FIG. 17, a twentieth embodiment of the invention provides an optical network 160 comprising an optical amplifier chain. The optical amplifier chain comprises a plurality of optical apparatus 140, a plurality of optical links 152 and network control apparatus 162.

The optical apparatus 140 are as described above in any of the sixteenth to eighteenth embodiments of the invention and shown in FIG. 15. Each optical link 152 connects the optical amplifiers in a respective pair of optical apparatus 130.

The network control apparatus 162 is arranged to generate and transmit the optical control signal 144a to a first one of the optical apparatus in the amplifier chain.

The first optical apparatus 140 is an OADM and each subsequent optical apparatus is an OLA.

Figure 18:
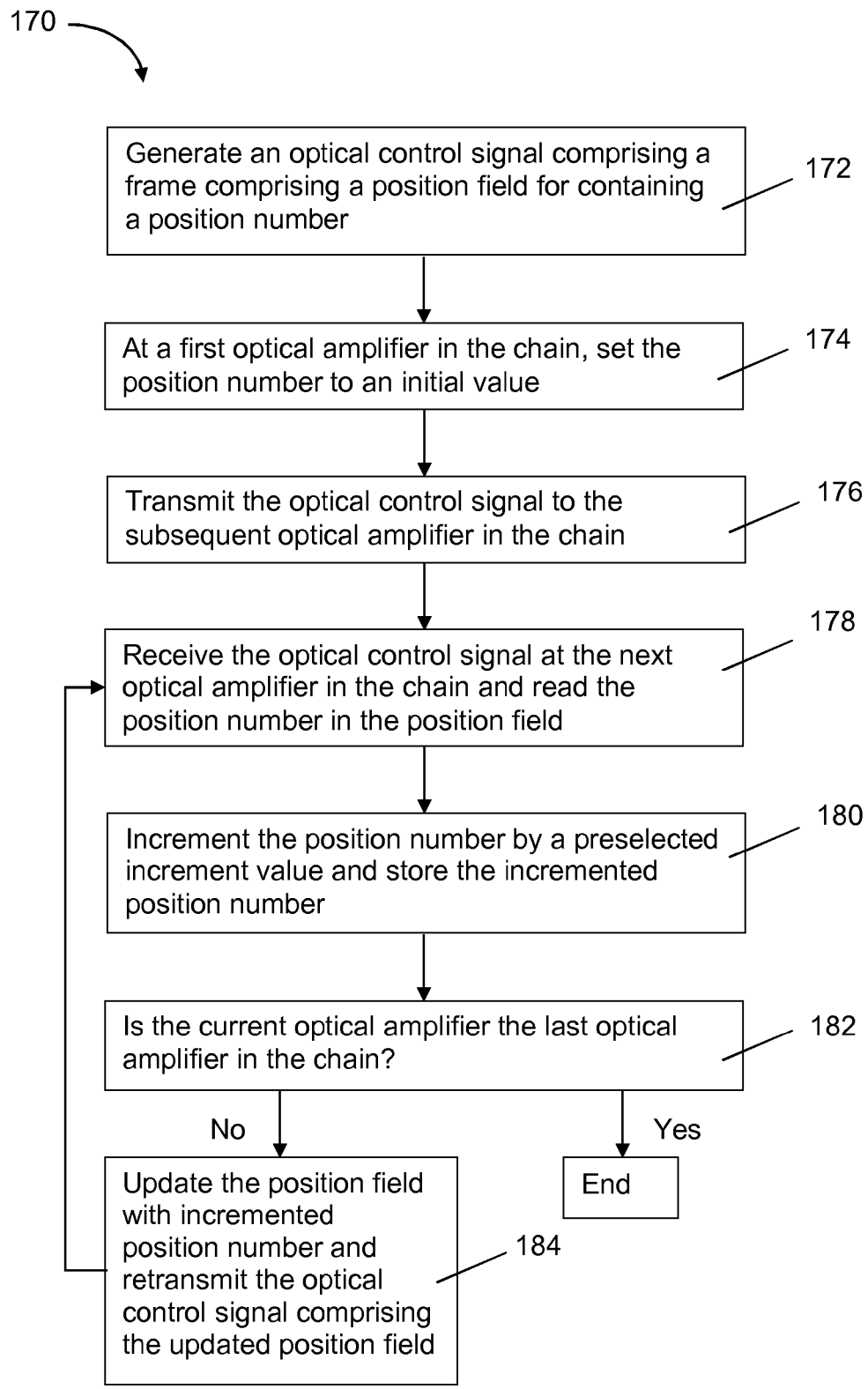
FIG. 18 shows the steps of a method according to a twenty-first embodiment of the invention of method of providing each of a plurality of optical amplifiers arranged in an optical amplifier chain in an optical network with a respective position number.

Referring to FIG. 18, a twenty-first embodiment of the invention provides a method 170 of providing each of a plurality of optical amplifiers arranged in an optical amplifier chain in an optical network with a respective position number.

The method comprises:
a. generating an optical control signal comprising a frame comprising a position field for containing a position number 172;
b. setting the position number to an initial value for a first optical amplifier in the chain 174;
c. transmitting the optical control signal from the first optical amplifier to a subsequent optical amplifier in the chain 176; and
d. sequentially at each subsequent optical amplifier in the chain:
  i. receiving the optical control signal transmitted from a preceding optical amplifier in the chain and reading the position number 178;
  ii. incrementing the position number by a preselected increment value and store the incremented position number 180; and
  iii. updating the position field with the incremented position number and retransmitting the optical control signal comprising the updated position field 184.

A twenty-second embodiment of the invention provides a method of providing each of a plurality of optical amplifiers arranged in an optical amplifier chain in an optical network with a respective position number. The method of this embodiment is similar to the method 170 of the previous embodiment and will be described with reference to FIG. 18.

Figure 19:
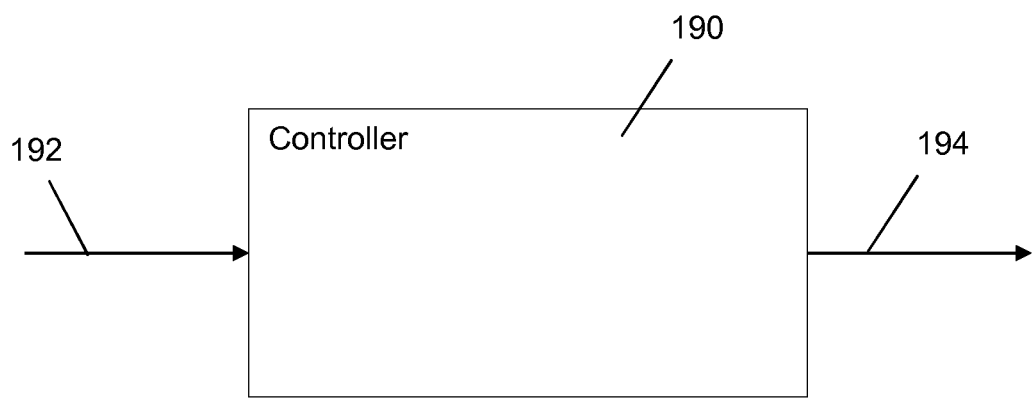
FIG. 19 is a schematic representation of an optical amplifier controller according to a twenty-third embodiment of the invention.

In this embodiment, the optical control signal is provided on an optical service channel, which is one of an OSC signal and an in-band optical signal. Referring to FIG. 19, a twenty-third embodiment of the invention provides an optical amplifier controller 190.

The controller 190 is arranged to receive an optical control signal 192 comprising a frame comprising a position field containing a position number. The controller is arranged to read the position number, increment the position number by a preselected increment value, update the position field with the incremented position number and store the incremented position number. The controller 190 is additionally arranged to generate and transmit a further optical control signal 194 having the incremented position number in the position field of the optical control signal frame.

A twenty-fourth embodiment of the invention provides a data carrier having computer readable instructions embodied therein. The said computer readable instructions are for providing access to resources available on a processor and the computer readable instructions comprising instructions to cause the processor to perform any of the above steps of the method of changing operating mode of an optical amplifier in an amplifier chain in an optical network.

A twenty-fifth embodiment of the invention provides a data carrier having computer readable instructions embodied therein. The said computer readable instructions being for providing access to resources available on a processor and the computer readable instructions comprising instructions to cause the processor to perform any of the above steps of the method of changing operating mode of a plurality of optical amplifiers arranged as an amplifier chain in an optical network.

The invention claimed is:

1. A method of changing operating mode of an optical amplifier in an amplifier chain in an optical network, the optical amplifier initially configured to operate in a first mode to apply a substantially constant first gain to an optical signal comprising a plurality of optical channels, the method comprising, after a unique time period that is unique to the optical amplifier within the amplifier chain, configuring the optical amplifier to operate in a second mode to apply a second gain to the optical signal so that the optical power of the optical signal is maintained at a target optical power dependent on a current plurality of optical channels in the optical signal, wherein the unique time period is based on a preselected time period and the optical amplifier is configured to operate in the second mode on expiry of said unique time period, and wherein the unique time period is managed in parallel with a time period of any other amplifier in the amplifier chain and no communication or coordination is performed between the optical amplifier and any other amplifier in the amplifier chain regarding the unique time period.

2. A method as claimed in claim 1, wherein said time period is equal to a preselected time period plus an additional time period unique to the optical amplifier within the amplifier chain.

3. A method as claimed in claim 2, wherein the optical amplifier is provided with a position number indicative of a position of the optical amplifier in the amplifier chain and wherein the additional time period is a number of seconds proportional to a constant multiplied by the position number.

4. A method as claimed in claim 3, wherein the method comprises providing each optical amplifier with a respective position number, by:
generating an optical control signal comprising a frame comprising a position field for containing a position number;
setting the position number to an initial value for a first optical amplifier in the chain;
transmitting the optical control signal from the first optical amplifier to a subsequent optical amplifier in the chain; and
sequentially at each subsequent optical amplifier in the chain:
  receiving the optical control signal transmitted from a preceding optical amplifier in the chain and reading the position number;
  incrementing the position number by a preselected increment value and store the incremented position number; and
  updating the position field with the incremented position number and retransmitting the optical control signal comprising the updated position field.

5. A method as claimed in claim 2, wherein the additional time period is a randomly generated time period.

6. A method of operating a plurality of optical amplifiers arranged as an amplifier chain in an optical network, the optical amplifiers each initially configured to operate in a first mode to apply a substantially constant respective first gain to an optical signal comprising a plurality of optical channels, the method comprising configuring each optical amplifier to operate in a second operating mode to apply a respective second gain to the optical signal so that the optical power of the optical signal is maintained at a target optical power dependent on a current plurality of optical channels in the optical signal, each optical amplifier being configured to operating in the second operating mode after a respective time period unique to itself within the amplifier chain, wherein the respective time period that is unique to each optical amplifier is based on a preselected time period and each respective optical amplifier is configured to operate in the second mode on expiry of said respective time period that is unique to the respective optical amplifier, and wherein the respective time period is managed in parallel with a time period of any other amplifier in the amplifier chain and no communication or coordination is performed between the optical amplifier and any other amplifier in the amplifier chain regarding the respective time period that is unique to the respective optical amplifier.

7. A method as claimed in claim 5, wherein a first optical amplifier in the chain is configured to operate in the second mode on expiry of a preselected time period and each subsequent optical amplifier in the chain is configured to operate in the second mode on expiry of a respective time period equal to said preselected time period plus a respective additional time period unique to said optical amplifier in the amplifier chain.

8. A method as claimed in claim 6, wherein the method comprises providing each optical amplifier with a respective position number, by:
  generating an optical control signal comprising a frame comprising a position field for containing a position number;
  setting the position number to an initial value for a first optical amplifier in the chain;
  transmitting the optical control signal from the first optical amplifier to a subsequent optical amplifier in the chain; and
  sequentially at each subsequent optical amplifier in the chain:
  receiving the optical control signal transmitted from a preceding optical amplifier in the chain and reading the position number;
  incrementing the position number by a preselected increment value and store the incremented position number; and
  updating the position field with the incremented position number and retransmitting the optical control signal comprising the updated position field.

9. Optical apparatus for an amplifier chain of an optical network, the apparatus comprising:
  an optical amplifier configured to amplify an optical signal comprising a plurality of optical channels; and
  a controller arranged to cause the optical amplifier to operate in one of a first mode and a second mode, in the first mode the optical amplifier being configured to apply a substantially constant first gain to the optical signal and in the second mode the optical amplifier being configured to apply a second gain to the optical signal so that the optical power of the optical signal is maintained at a target optical power dependent on a current plurality of optical channels in the optical signal, and wherein the controller is arranged to cause the optical amplifier to change from the first mode to the second mode after a unique time period that is unique to the optical apparatus within the amplifier chain, wherein the unique time period is based on a preselected time period and the optical amplifier is configured to operate in the second mode on expiry of said unique time period, and wherein the unique time period is managed in parallel with a time period of any other amplifier in the amplifier chain and no communication or coordination is performed between the optical amplifier and any other amplifier in the amplifier chain regarding the unique time period.

10. Optical apparatus as claimed in claim 9, wherein said time period is equal to a preselected time period plus an additional time period unique to the optical apparatus within the amplifier chain.

11. Optical apparatus as claimed in claim 10, wherein said additional time period is proportional to a position of the optical apparatus in the amplifier chain.

12. Optical apparatus as claimed in claim 11, wherein the controller is additionally arranged to obtain a position number indicative of the position of the optical apparatus in the amplifier chain and wherein the controller is additionally arranged to calculate the additional time period as a number of seconds proportional to a constant multiplied by the position number.

13. Optical apparatus as claimed in claim 12, wherein the controller is additionally arranged to:
  receive an optical control signal comprising a frame comprising a position field containing a position number;
  read the position number;
  increment the position number by a preselected increment value and update the position field with the incremented position number;
  store the incremented position number; and
  generate and transmit a further optical control signal having the incremented position number in the position field of the optical control signal frame.

14. Optical apparatus as claimed in claim 12, wherein the controller is additionally arranged to:
  receive an optical control signal comprising a frame comprising a position field containing a position number;
  set the position number in the position field to an initial position number; and
  generate and transmit a further optical control signal having the initial position number in the position field of the optical control signal frame.

15. Optical apparatus as claimed in claim 10, wherein said additional time period is a randomly generated time period.

16. Optical apparatus as claimed in claim 9, wherein the controller is additionally arranged to receive an indication of the current plurality of optical channels during the preselected time period.

17. An optical network comprising an optical amplifier chain comprising:
  a plurality of optical apparatus as claimed in any of claim 8; and
  a plurality of optical links, each optical link connecting the optical amplifiers in a respective pair of said plurality of optical apparatus.

18. A method of providing each of a plurality of optical amplifiers arranged in an optical amplifier chain in an optical network with a respective position number, the method comprising:
  generating an optical control signal comprising a frame comprising a position field for containing a position number;

setting the position number to an initial value for a first optical amplifier in the chain;

transmitting the optical control signal from the first optical amplifier to a subsequent optical amplifier in the chain; and sequentially at each subsequent optical amplifier in the chain:
- receiving the optical control signal transmitted from a preceding optical amplifier in the chain and reading the position number;
- incrementing the position number by a preselected increment value and store the incremented position number; and
- updating the position field with the incremented position number and retransmitting the optical control signal comprising the updated position field.

19. An optical amplifier controller arranged to:

receive an optical control signal comprising a frame comprising a position field containing a position number;

read the position number;

increment the position number by a preselected increment value and update the position field with the incremented position number;

store the incremented position number; and generate and transmit a further optical control signal having the incremented position number in the position field of the optical control signal frame.

* * * * *